O. JOHNSON.
PISTON RING EXPANDER AND CONTRACTOR.
APPLICATION FILED DEC. 3, 1919.
1,379,021.  Patented May 24, 1921.
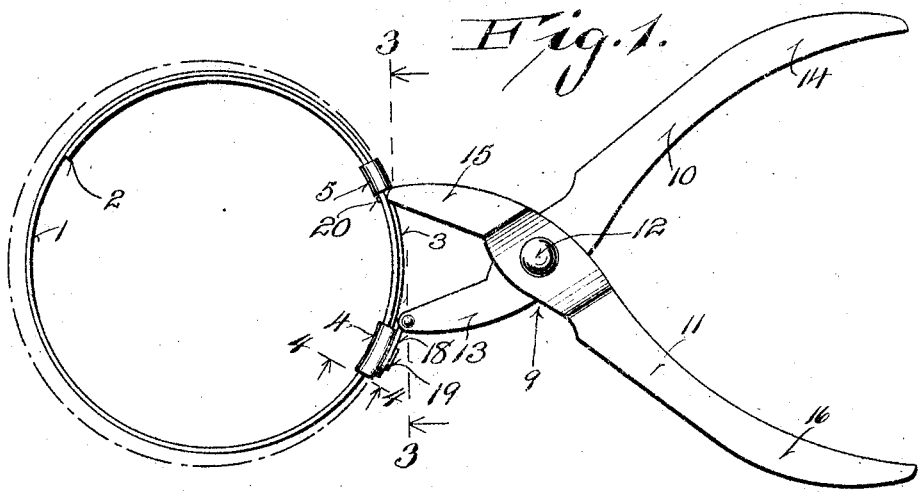
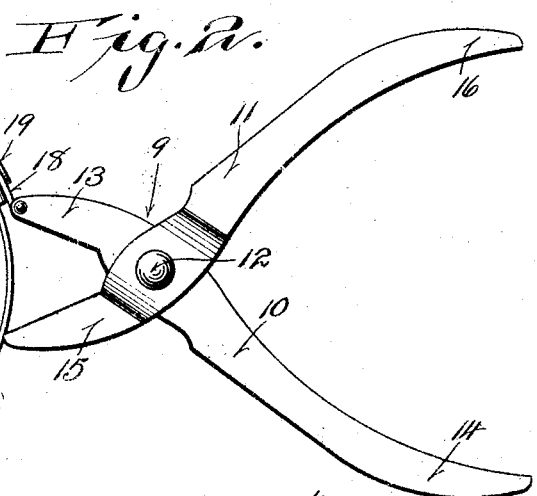
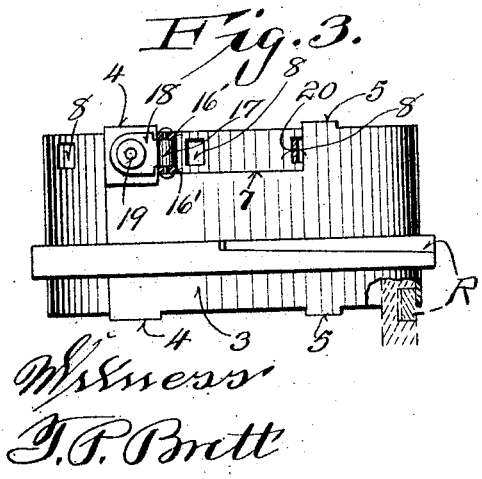
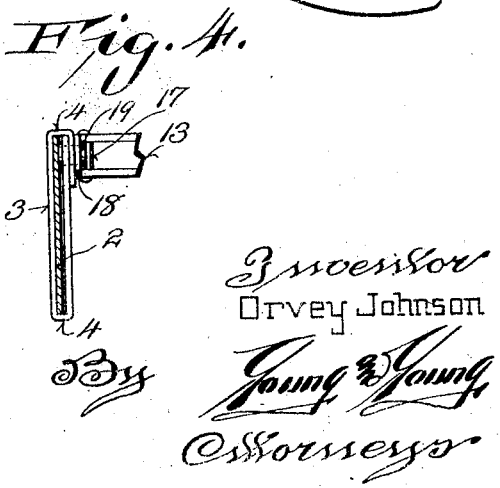
Inventor
Orvey Johnson
Witness
J. P. Britt
By Young & Young
Attorneys

UNITED STATES PATENT OFFICE.

ORVEY JOHNSON, OF MADISON, WISCONSIN, ASSIGNOR TO THE JOHNSON SPECIALTY COMPANY, OF MADISON, WISCONSIN.

PISTON-RING EXPANDER AND CONTRACTOR.

1,379,021.  Specification of Letters Patent.  Patented May 24, 1921.

Application filed December 3, 1919. Serial No. 342,108.

*To all whom it may concern:*

Be it known that I, ORVEY JOHNSON, a citizen of the United States, and resident of Madison, in the county of Dane and State of Wisconsin, have invented certain new and useful Improvements in Piston-Ring Expanders and Contractors; and I do hereby declare that the following is a full, clear, and exact description thereof.

My invention relates to new and useful improvements in engine appliances, particularly in devices adapted for contracting and expanding engine piston rings.

To those familiar with the art, it is well known that it is comparatively difficult to assemble piston rings in the grooves of a piston and the piston in a cylinder. For instance when a piston ring is to be placed around a piston, it must first be expanded. A primary object of my invention is to provide a simply constructed and quickly operating device for procuring such necessary expansion of piston rings.

Then again it ordinarily requires considerable manipulation to insert a piston provided with rings in its cylinder. Another primary object of the invention is therefore to provide a contracting means whereby the rings may be contracted and the piston more readily inserted in the cylinder.

A further object of the invention is to provide a device of this character which is capable of being adjusted for various diameters of rings and to procure different expansions or contractions of rings of the same size.

With these and other general objects in view, the invention consists in the novel features of construction, combination and arrangement of parts which will be hereinafter particularly described and claimed.

In the accompanying drawings:

Figure 1 denotes a plan view of an appliance constructed in accordance with my invention, showing its use as a ring expanding tool.

Fig. 2 is a similar view, the device being used as a ring contractor.

Fig. 3 is a transverse sectional view taken upon the plane of the line 3—3 of Fig. 1, and Fig. 4 is a detail vertical section on the plane of the line 4—4 of Fig. 1.

It is to be understood that various changes may be made in the form and proportions and in the general association of the several parts of the device without departing from or sacrificing any of the features thereof.

Referring more particularly to the drawings, it will be noted that the reference character R, designates a piston ring of an ordinary design which is to be expanded or contracted through the medium of an expansile and retractile resilient collar or band 1, the end portions 2 and 3 of which are overlapped as clearly indicated in Figs. 1 and 2. In other words a strip of resilient material of requisite width and length is rolled transversely until its end portions overlap, and when this resulting ring of material is increased or decreased in diameter such end portions slidably engage each other.

To retain the end portions of the collar 1 in engagement with each other and to guide the same during their sliding movement, tongues 4 and 5 are extended from the longitudinal edges of the end portion 3. From the several figures of the drawing it will be noted that these tongues are bent upon themselves and around the adjacent longitudinal edges of the collar and the inside thereof to provide guides (see Fig. 4, particularly).

The tongue 5 is spaced inwardly of the tongue 4, and one longitudinal edge portion of the end 3 between the pair of tongues 4 and 5 is cut out to provide a recess 7. The other end portion 2 is formed with a longitudinal row of openings 8, each of which successively registers with the recess 7 as the collar is expanded or contracted. In view of this registration and the fact that the inner edges of the openings 8 coincide with the inner edge of the recess 7, the row of openings 8 is positioned parallel, and closely, to one longitudinal edge of the collar.

An expanding and contracting device 9 is adapted to be used for increasing or diminishing the diameter of the collar 1, and consists of a pair of levers 10 and 11 which are crossed intermediate their ends and pivoted together as at 12. This arrangement forms a jaw 13 and a handle portion 14 from the lever 10, and a jaw 15 and a handle portion 16 from the lever 11.

The jaw 13 has a pair of spaced hinge knuckles 16' between which a hinge knuckle 17 is pivoted.

The knuckle 17 has an attaching portion 18 extended therefrom and pivoted as at 19 to the end portion 3 of the collar 1 adjacent the outer end of the recess 7. By this arrangement the knuckle 17, and consequently the jaw 13 may be swung to either side of a transverse plane extending through the pivot 19.

The other jaw 15 has a finger 20 extending therefrom which is designed to engage in any one of the several openings 8. This engagement may be procured with respect to those openings which are in registration with the recess 7, or with those disposed beyond the end of the portion 3 of the collar.

If the invention is to be used as a piston ring expander, the device 9 is arranged with respect to the collar as shown in Fig. 1, the finger 20 of the jaw 15 being extended through the recess 7 and into engagement with the proper opening 8. With the parts thusly disposed it is seen that by moving the handle portions 14 and 16 together, the collar will be increased in diameter, as for instance as illustrated in the dot and dash line of Fig. 1.

Various degrees of expansion are obviously procured by the engagement of the finger 20 with the different openings 8.

On the other hand when the invention is to be used as a contracting device, the member 9 is rotated 180° on the pivot 19 with respect to the collar 1 to position the jaws 13 and 15 as shown in Fig. 2. The finger of the jaw 15 may now readily engage with either of the openings 8 located outwardly of the end 3. Movement of the handle portions 14 and 16 of the device 9 will now have the effect of reducing the diameter of the collar as shown in the dot and dash line of Fig. 2.

From the foregoing description taken in connection with the accompanying drawing it will be evident that I have devised a very simple combination appliance which will be equally efficient as a contracting device or as an expanding device. Owing to its simplicity and the few number of its parts, it may be inexpensively manufactured and easily operated. Various changes may be made in the form and proportion of the several parts to permit the principle of the invention to be employed in various arts, such changes being within the contemplation of the inventer as disclosed by the following claims.

What is claimed is:

1. A device of the class described comprising an expansile and contractile collar having its ends adapted to be overlapped, one end portion having a plurality of openings arranged longitudinally of the collar, a pair of expanding and contracting handles, one being hinged and pivoted to one end portion of the collar, and a finger on the other handle for selective coöperation with any of said openings.

2. A device of the class described comprising an expansile and contractile collar having its end portions overlapped and slidably engaged, the outer end portion having a recess formed therein, there being a plurality of attaching means carried by the inner end portion and adapted to register with said recess when said end portions are slid one upon the other, and an expanding and contracting device having one part connected with the outer end portion of the collar and the other part adapted to be extended through said recess into engagement with any of said attaching means or with the attaching means positioned exteriorly of the recess.

3. A device of the class described comprising an expansile and contractile collar having its end portions overlapped and slidably engaged, the outer end portion having a recess formed therein, the inner end portion having a plurality of openings arranged longitudinally of the collar and adapted to register with said recess when the end portions are slid one upon the other, and an expanding and contracting device comprising a pair of jaws, one being connected to the outer end portion of the collar and the other adapted to extend through said recess to selectively enter any of said openings.

In testimony that I claim the foregoing I have hereunto set my hand at Milwaukee, in the county of Milwaukee and State of Wisconsin.

ORVEY JOHNSON.